June 4, 1935.   H. J. WOOCK   2,003,567
METHOD OF CIRCULATING HOT WATER THROUGH THE
PRESSURE BAGS OF TIRE RETREADING MOLDS
Original Filed April 21, 1931   2 Sheets-Sheet 1
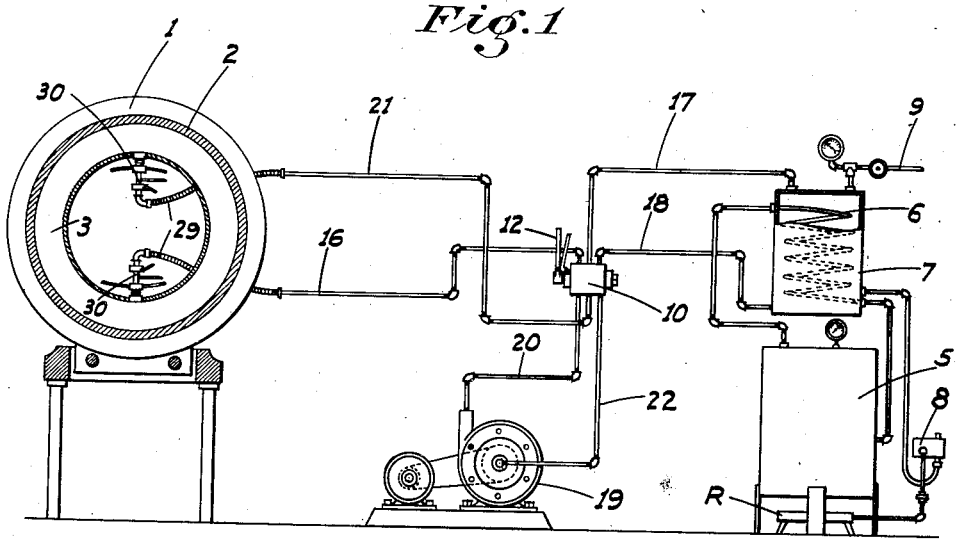
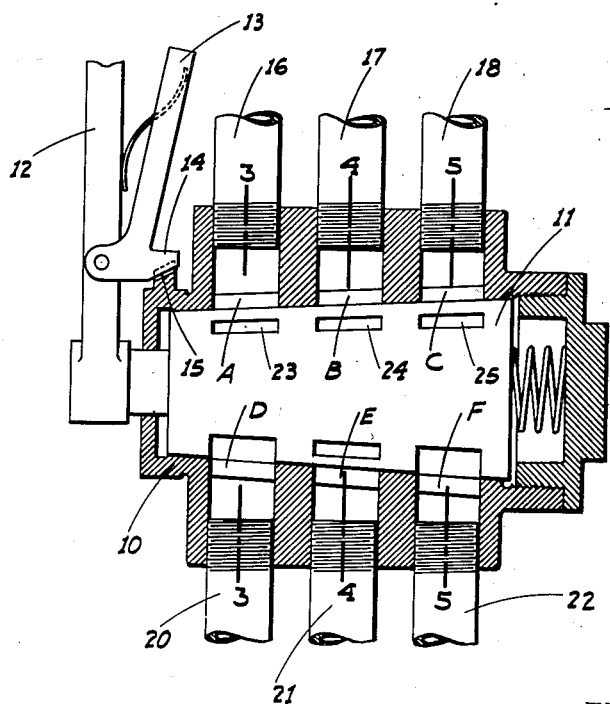
INVENTOR.
H. J. Woock
BY
ATTORNEY INVENTOR.
H. J. Woock
BY
ATTORNEYS.

Patented June 4, 1935

2,003,567

UNITED STATES PATENT OFFICE 2,003,567

METHOD OF CIRCULATING HOT WATER THROUGH THE PRESSURE BAGS OF TIRE RETREADING MOLDS

Herbert J. Woock, Lodi, Calif., assignor to Super Mold Corporation, Lodi, Calif., a corporation of Nevada Original application April 21, 1931, Serial No. 531,729. Divided and this application December 11, 1934, Serial No. 756,947

3 Claims. (Cl. 18—53)

This invention relates to a method of circulating water heated to vulcanizing heat through the interior pressure bag of a tire retreading mold, preferably of the full circle type, such as shown in my Patent No. 1,764,378, dated June 17, 1930; and is particularly directed to the method of filling and retaining such inner pressure bag full of water heated to vulcanizing temperature and under pressure.

This application is a division of my application Serial No. 531,729, filed April 21, 1931.

An object of the present invention is to provide a method for the purpose recited whereby there is established a central supply of water and the water placed under a continuous gas pressure so that the water may be heated to vulcanizing temperature without turning into steam. Provision is then made to circulate the thus heated water through the pressure bag while maintaining it under such pressure. This circulation under the conditions stated will be maintained until vulcanization is complete when the water will be circulated back to the source of supply while still maintained under pressure and the gas will follow through into the pressure bag as the water is expelled. The heated water is thus retained for further and repeated use when once brought to vulcanizing temperature so that there will be no undue waste of either water or heat, thus minimizing the cost of operation.

I accomplish these objects preferably by such structure and relative arrangement of parts and the use thereof in carrying out the steps of the method which accomplishes the results desired, all as will fully appear by a perusal of the following specification and claims.

In the drawings similar characters of reference indicate corresponding parts in the several views.

Figure 1 is a diagrammatic elevation of my improved circulating system.

Figure 2 is a sectional elevation of a six-way valve preferably used to effect the centralized control of the system and showing the valve plug in its neutral position.

Figure 3:
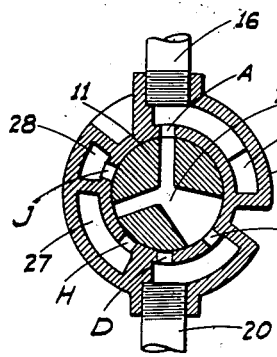
Figures 3–5 are cross sections of the valve taken on the lines 3—3, 4—4 and 5—5 respectively of Figure 2, and showing the valve plug in the position occupied when water is being circulated through the tire pressure bag.

Referring now more particularly to the characters of reference on the drawings, the numeral 1 denotes one of the continuous circular sections of a retreading mold in which the tire 2 is mounted. The pressure bag 3 is placed inside the tire which tire is engaged by a rim 4 which prevents the sides of the tire from spreading and also confines the bag in place. Steam to heat the mold chambers is generated in the usual manner by an apparatus which has no relation with the present invention, and hence is not shown.

I will now describe in detail the water heating and circulating system by which the water heated to vulcanizing heat is circulated through the pressure bag and controlled in the manner and form desired and to which the herein disclosed method relates.

The numeral 5 designates the steam generating boiler. A steam coil 6 is arranged in communication with the boiler so that a continuous circulation of steam will be had through the coil as the same is generated in the boiler 5. A water tank 7 surrounds the coil so that water introduced into this tank will be heated by transference of the heat from the steam moving through the coil. The water in the tank is maintained at a constant temperature by providing an automatic thermostatic control device 8 connected to the tank and to the burner R of the boiler 5.

A pipe 9 leads from a source of compressed gas such as air, located at a point remote from the system and is connected to the top of the tank 7. The pressure in this pipe 9 is constant and is maintained at a pressure sufficient to prevent the water in the tank 7 from flashing into steam when it is heated to the high temperature necessary for vulcanization purposes.

The numeral 10 designates the casing of a special six-way valve in which the valve plug 11 is turnably mounted. A handle 12 applied to one end of the plug controls its turning while a pawl arm 13 is pivoted on the handle and has a nub 14 attached thereto to engage a notched flange 15 on one end of the casing 10. The notches in this flange are spaced so that the plug may be held in any one of three predetermined positions. The casing 10 has opposed pairs of ports A and D, B and E, C and F. The port A is connected to the bag 3 at the bottom by a pipe 16; the port B is connected to the top of the tank 7 by a pipe 17; and the port C is connected to the bottom of the tank 7 by a pipe 18. The port D is connected by a pipe 20 to the discharge side of a circulating pump 19; the port E is connected to the bag 3 at the top by a pipe 21; while the port F is connected by a pipe 22 to the intake side of the pump 19.

Figure 4:
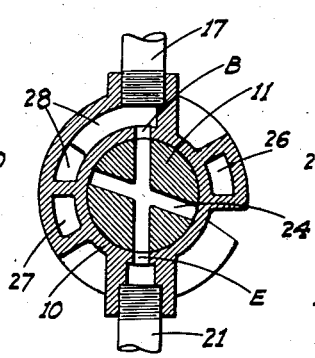
Figure 5:
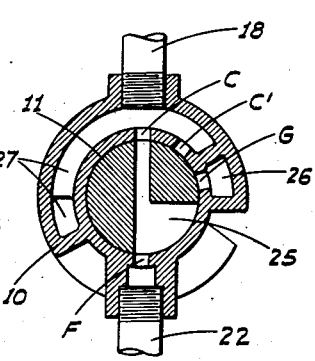
Figure 6:
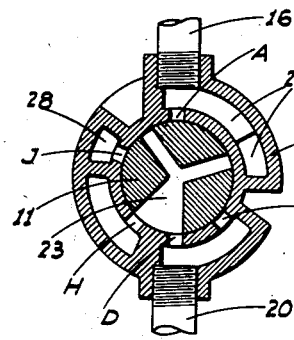
Figures 6–8 are similar sectional views of the valve showing the positions of the valve plug when the water is exhausted from the bag and replaced by air.
Figure 7:
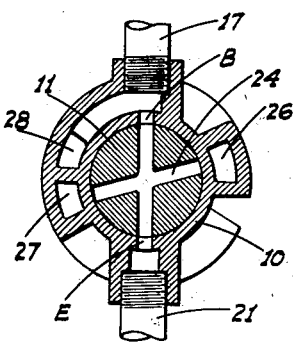
Figure 8:
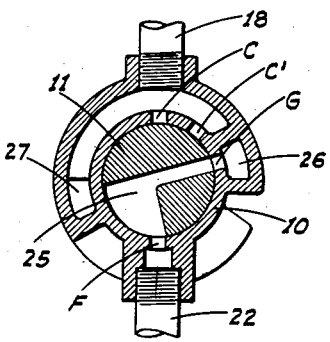

The plug 11 is provided with a plurality of passages 23, 24 and 25 to register with ports A and D, B and E, and C and F respectively. These are so arranged that upon turning the plug to a certain position the water may be fed into the bag 3 and circulated therethrough while being maintained at the predetermined pressure. This result is obtained as follows:

The water may pass from the pipe 18 through the valve ports C and E and plug passage 25 and to the intake of the pump through the pipe 22, from the discharge side of the pump through the pipe 20 back to the valve, and from the valve to the bag through the pipe 16 by means of ports A and D' and plug passage 23. At the same time a return circulation of the water is had through the pipe 21, the valve by means of ports E and B and the plug passage 24, and the pipe 17 back to the top of the tank. The position of the plug in the valve body to give these results is shown in Figures 3, 4 and 5.

The air pressure from the pipe 9 being constantly on the water in the tank, the water in the pipes and pressure bag may be held at whatever pressure is desired. By means of this pressure the water throughout the system, which is heated to a relatively high temperature by contact with the steam coil, is kept from turning into steam. During the period of circulation of the water from the tank 7 to and through the bag 3 and back to the tank 7, the valve plug is left in the position described above in order to permit of the continuous circulation of the water, so heated to vulcanizing temperature, as long as the retreading operation is in progress.

When vulcanization is complete and it is desired to empty the bag of the heated water, the valve plug is then turned to that position which gives a shift in the cycle of circulation, which I will now describe.

The water from the bag passes to the valve 10 through the pipe 16 and leaves the valve through the pipe 22. This cycle is provided for by means of a by-pass 26 in the valve body leading from the pipe 16 to a port G in said body in alinement with the plug passage 25 which then registers with said port G and the port F. The water then passes to the pump and circulates through the pipe 20 and then passes from the valve back to the tank through the pipe 18. This cycle is provided by means of another by-pass 27 in the valve body leading from a port H in the body in alinement with the plug passage 23 and extending to the pipe 18; the passage 23 then being positioned to place the ports D and H in communication.

As the water is moved from the pressure bag back to the tank in the manner above described the compressed air or gas flows from the tank 7 and follows up the receding water in the following manner:

Such air or gas leaves the tank 7 through the pipe 17 and passes through the valve into the top of the pressure bag 3 through the pipe 21 by way of ports B and E and the plug passage 24. It will thus be seen that as the bag 3 is completely emptied of water, the water is replaced by the compressed air so that the water is maintained under its constant predetermined pressure as it is returned to the tank 7 and is prevented from flashing into steam and there is no wastage of water, but the same is returned to the initial source of supply ready for repeated use.

Figure 9:
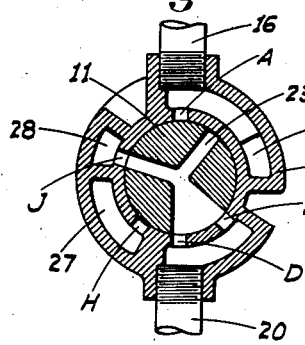
Figures 9–11 are similar sections of the valve showing the valve plug in its neutral position, or when the water is merely being circulated between the pump and the tank.
Figure 10:
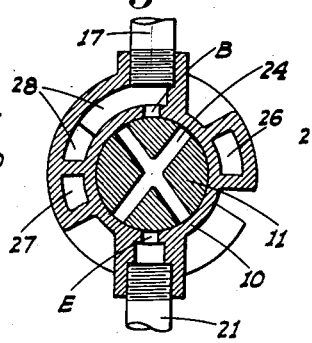
Figure 11:
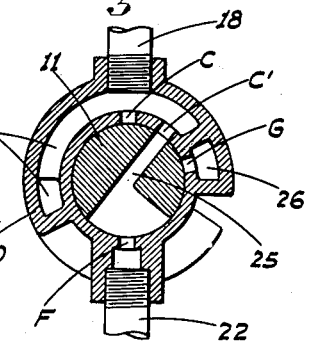

The water now being all relieved from the bag and returned to the source of supply and the water in the bag being replaced by the compressed air I then provide for the exhaustion of the air from the bag so that the tire may be removed from the mold; and I also provide for the continued circulation of the water through the tank 7 so that it may be kept up to proper vulcanizing temperature while the tire is being taken from the mold and replaced by another. To accomplish these steps the valve plug is moved to the positions shown in Figures 9, 10 and 11. This brings a by-pass 28 in the valve body leading from a port J in said body in alinement with the plug passage 23 to the pipe 17. The plug passage 23 then establishes communication between the ports D and J. The passage 24 then breaks communication between the pipes 17 and 21 so that the air is shut off from passing back to the bag. The air then remaining in the bag can be exhausted to the atmosphere without the need of any other shut off valves at the bag connections. If it is not desired to circulate the water when it is not being passed to the pressure bag, it is only necessary of course to halt the operation of the pump when the parts are in the above positions.

The pipes 16 and 21 are provided with flexible connecting hoses 29 by which connection is made with the inlet pipes 30 which lead into the top and bottom of the pressure bag for the purpose of turning out the circulation of the water and air as above described, which hoses and pipes are provided with any suitable means for connecting and disconnecting them, the particular construction of which is not essential to the invention herein disclosed, just so long as means is provided for properly admitting and withdrawing the circulating air and water.

From the foregoing description of the mechanism by which my improved method is carried out it will be apparent that the method per se comprises first, the step of establishing a source of water supply, placing this water supply under pressure with a gas to prevent the water when heated to vulcanizing temperature from flashing into steam, and then heating the water to vulcanizing temperature. This source of water so heated to vulcanizing temperature being established, the next step in the method is to circulate the same continuously through the pressure bag while keeping it under the necessary pressure. This step is continued until vulcanization has taken place. When vulcanization is complete the next step then is to withdraw the water from the bag and return it to the source of supply while following it up with the gas under pressure so as to prevent the same from flashing into steam and to clear the bag and pipes of the water and return it back to the source of supply where it may be continuously circulated around the heating coils to hold the heated water ready for repeated use.

The water is then shut off from circulating to the bag and the air pressure is shut off from circulating to the bag, leaving the bag free to be exhausted of air when removed from the mold. These consecutive steps provide a very efficient method whereby the same water may be repeatedly used, thus effecting both a saving of water and heat which would necessarily be involved in case the water was merely circulated through the pressure bag and then withdrawn and discharged through a drain or other place without returning it to the source of supply for conservation and in readiness for repeated use.

It is to be understood that while I have specified water as being the liquid preferably used, other liquids such as oil, glycerine or the like are capable of being used instead. It is also to be understood that while I have shown and described the method of being capable of use in connection with a retreading mold, it is capable of being used with a tire making mold as well, or with a sectional repair mold.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. That method of circulating hot water through a pressure bag comprising the steps of establishing a source of hot water, maintaining a gas pressure on the water to keep it liquid, circulating the water through the bag while maintaining the gas pressure, continuing such circulation for a desired length of time, discontinuing the circulation of the water through the bag, and returning the water to its source while still maintaining it under such gas pressure.

2. That method of circulating hot water through a pressure bag comprising the steps of establishing a source of hot water, establishing a source of gas under pressure and maintaining the gas under pressure against the water to keep the water liquid, circulating the water a desired length of time through the bag while maintaining the gas pressure against the same, discontinuing the circulation of the water through the bag and returning the water to its source, replacing the water as it is withdrawn from the bag with the gas under pressure, and then breaking communication between the bag and both the source of water and gas.

3. That method of circulating hot water through a pressure bag comprising the steps of establishing a source of hot water, establishing a source of gas under pressure and maintaining the gas under pressure against the water to keep the water liquid, circulating the water a desired length of time through the bag while maintaining the gas pressure against the same, discontinuing the circulating of the water through the bag and returning the water to its source, replacing the water as it is withdrawn from the bag with the gas under pressure, then breaking communication between the bag and both the source of water and gas, and then exhausting the gas from the bag.

HERBERT J. WOOCK.